July 23, 1957
W. D. PETERS
2,800,394
METHOD OF AND APPARATUS FOR CONTROLLING
CARBON BLACK FURNACES
Filed April 11, 1955
3 Sheets-Sheet 1
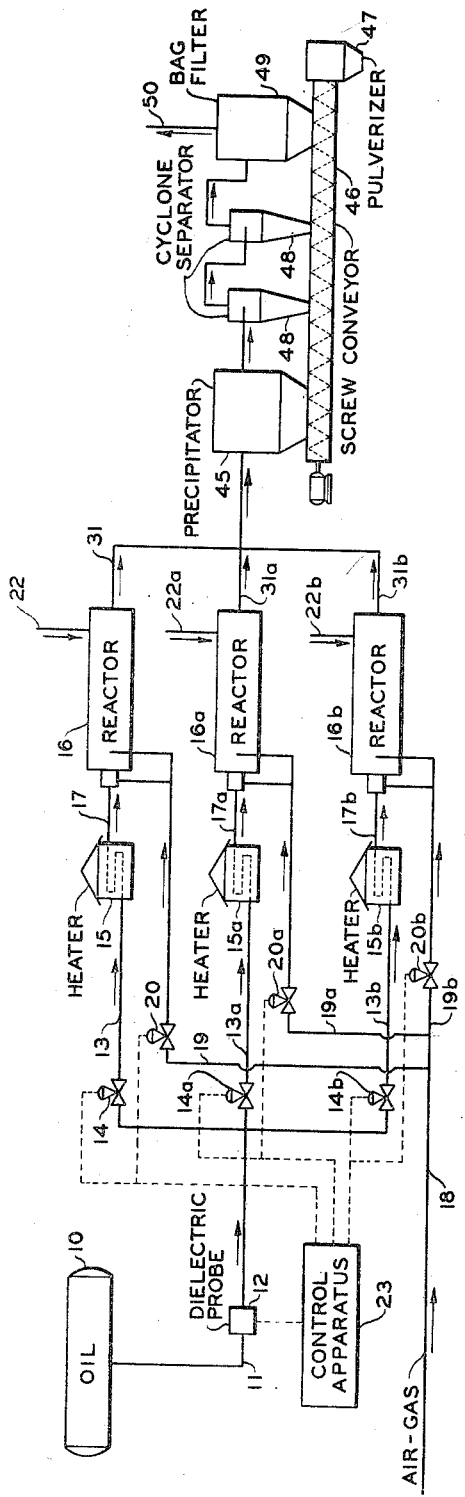
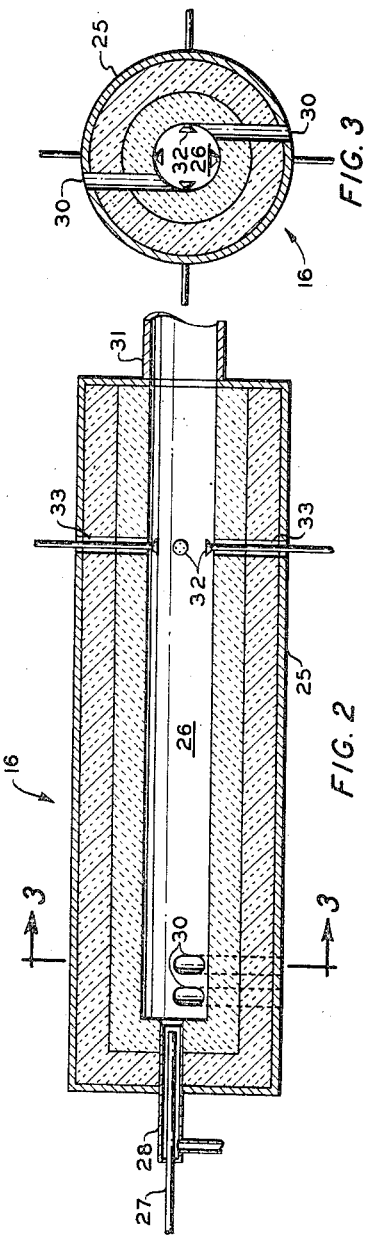
INVENTOR.
W. D. PETERS
BY *Hudson & Young*
ATTORNEYS July 23, 1957 W. D. PETERS 2,800,394
METHOD OF AND APPARATUS FOR CONTROLLING
CARBON BLACK FURNACES
Filed April 11, 1955

INVENTOR.
W. D. PETERS
BY Hudson & Young
ATTORNEYS

INVENTOR.
W. D. PETERS

BY Hudson & Young

ATTORNEYS

United States Patent Office 2,800,394
Patented July 23, 1957

2,800,394

METHOD OF AND APPARATUS FOR CONTROLLING CARBON BLACK FURNACES

William D. Peters, Bartlesville, Okla., assignor to Phillips Petroleum Company, a corporation of Delaware Application April 11, 1955, Serial No. 500,466

13 Claims. (Cl. 23—209.4)

This invention relates to a method of and apparatus for controlling carbon black producing operations.

In recent years the so-called "furnace" carbon blacks have become increasingly important because of their superior characteristics for use in rubber tires. The furnaces employed to produce these carbon blacks confine the combustion of a hydrocarbon fuel to a limited space. The air supplied is less than that required for complete combustion. The carbon-producing flames normally are quite large and in turbulent motion. After combustion, the carbon-laden gases are quenched and the carbon is separated from the gases by suitable means. In U. S. Patents 2,564,700 and 2,375,795, furnaces of this type are disclosed which preferably use hydrocarbon oils as conversion stocks. The oil is introduced axially into a cylindrical combustion chamber, and air or a combustible mixture is introduced in a direction tangential to the side wall of the chamber. The resulting carbon black is superior for many purposes to the blacks produced by other known methods.

In operating furnaces of these types, it is known that the quality of the conversion oil, the temperature in the furnace and the residence time of the combustible mixture in the reaction chamber affect the quality of the carbon black. Residence time and temperature are functions of feed rates to the furnace. Heretofore, it has been customary to control the quality of the produced carbon black by a Photelometer test. In such a test, two grams of the black is slurried with 50 milliliters of a transparent solvent such as chloroform, toluene, benzene, acetone, xylene or carbontetrachloride. The slurry is heated to the boiling point in one to two minutes and then filtered. The filtrate is cooled and placed in the Photelometer cell. Radiation is passed through the cell and the transmission is measured. The percent transmission is referred to as the "Photelometer reading," and serves to indicate the tarry residue present in the carbon black. It is desirable to produce carbon black which has a predetermined Photelometer reading. The quality of the carbon black produced is a definite function of the quality of the hydrocarbon conversion oil at a preselected air-oil ratio.

It is common practice to rate hydrocarbon conversion oils on the basis of the Bureau of Mines Correlation Index (BMCI). This index is calculated from the formula:

$$BMCI = 100\left(\frac{875.52}{460+F} + \frac{670.28}{G+131.5} - 4.568\right)$$

where G is the API gravity of the oil at 60° F. and F is the average boiling point of the oil in degrees F. This index is related to the carbon in the oil which is available for conversion. The measurement of the average boiling point of the oil is a time consuming operation, and for this reason it is not practical to control carbon black producing operation directly by such a measurement. If oils of varying BMCI are used in a given furnace, the air-oil ratio must be set to accommodate the particular oil requiring the highest ratio. This greatly diminishes the yield of produced carbon black because as the oil changes in composition an excess of air is present in the furnace.

In accordance with the present invention there is provided a method of controlling a carbon black furnace continuously and automatically to compensate for changes in composition of the conversion oil. This control method is based upon the discovery that the dielectric properties of the oil are directly related to the BMCI of the oil. The dielectric properties of the oil are measured and the ratio of air to oil supplied to the furnace is adjusted in response thereto to maintain desired operating conditions in the furnace. Apparatus is provided to control a plurality of furnaces in response to a single measurement of the conversion oil.

Accordingly, it is an object of this invention to provide a method and apparatus for controlling a carbon black producing furnace in response to a measurement of the dielectric properties of the conversion oil supplied to the furnace.

Another object is to provide a method of controlling a plurality of carbon black producing furnaces by a single analysis.

A further object is to provide a method of and apparatus for varying the ratio of air to oil supplied to a carbon black producing furnace to maintain a product of predetermined quality.

Other objects, advantages and features of the invention should become apparent from the following detailed description taken in conjunction with the accompanying drawing in which:

Figure 1 is a schematic representation of the control system of this invention applied to carbon black producing apparatus;

Figure 2 is a sectional view of one embodiment of a furnace which can be employed in the system of Figure 1;

Figure 3 is a sectional view taken along line 3—3 in Figure 2.

Figure 4:
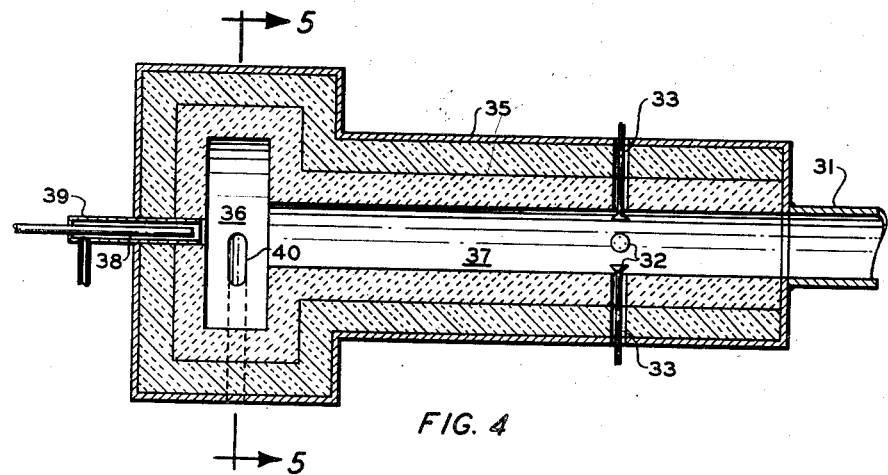
Figure 4 is a sectional view of a second embodiment of a furnace which can be employed in the apparatus of Figure 1.
Figure 5:
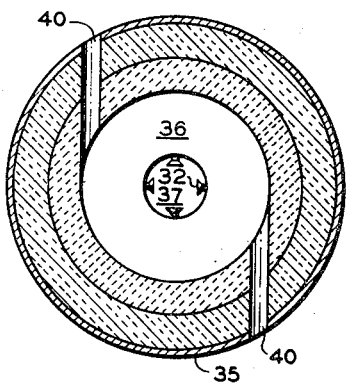
Figure 5 is a sectional view taken along line 5—5 in Figure 4.

Referring now to the drawing in detail, and to Figure 1 in particular, there is shown an oil storage tank 10 having an outlet conduit 11 connected thereto. A dielectric probe measuring unit 12 is contained in conduit 11. A first branch conduit 13, having a valve 14 therein, communicates between conduit 11 in the inlet of an oil heater 15. The outlet of heater 15 is connected by a conduit 17 with the first axial inlet passage of a carbon black producing reactor 16. Combustion supporting air, or a mixture of air and a combustible gas, is supplied from a source, not shown, by a conduit 18. A first branch conduit 19, having a valve 20 therein, communicates with reactor 16. Similar reactors 16a and 16b are illustrated in Figure 1. These reactors are supplied with oil and air by conduits similar to the conduits described in conjunction with reactor 16 and which are designated by corresponding a and b conduits.

One of the reactors 16 is illustrated in detail in Figures 2 and 3. The reactor comprises a cylindrical shell 25 which is lined with refractory material having a cylindrical central passage 26 therein. Oil from heater 15 is supplied to chamber 26 by a nozzle 27 which communicates with conduit 17 of Figure 1. A portion of the air supplied by conduit 19 of Figure 1 enters chamber 26 axially through a tube 28 which surrounds nozzle 27. The remainder of the air enters chamber 26 in directions tangential to the side wall thereof through a plurality of passages 30 which communicate with conduit 19 at the outer ends thereof. A vent conduit 31 is secured to the second end of shell 25 to convey the reaction products to a carbon black recovery system. A plurality of nozzles 32 extends through radial passages 33 which are formed in shell 25 downstream from the oil and air inlets. Nozzles 32 supply a quench medium to chamber 26.

The heated oil supplied to the reactor is passed axially into chamber 26. A small portion of air, or a mixture of air and a combustible gas, enters the reactor through tube 28. The remainder of the air enters the reactor through passages 30. The air and gas mixture admitted tangentially into the combustion chamber is ignited to form combustion products which are directed in a helical path about the periphery of chamber 26. If air alone is supplied, a portion of the axial oil is thus burned. The heat from this combustion serves to decompose the oil to produce carbon black and gaseous by-products. The small flow of axial air prevents oxidation of the tip of burner 28 and prevents carbon from depositing thereon. Water is introduced through nozzles 32 to quench the reaction products.

In Figure 4 there is shown a second embodiment of a reactor which can be employed in the carbon black producing system of Figure 1. The reactor of Figure 4 comprises a shell 35 enclosing a mass of refractory material which defines first and second cylindrical passages 36 and 37. Passage 36 is of larger diameter than passage 37 and is adjacent the inlet ports of the furnace. Oil and air are introduced into chamber 36 through respective nozzles 38 and 39 which correspond to respective nozzles 27 and 28 in the reactor of Figure 2. A gas and air mixture is introduced into chamber 36 through passages 40 which are tangential to the side wall of chamber 36. The combustible gases introduced through passages 40 are ignited to form combustion products which surround the hydrocarbon oil introduced through nozzle 38. The combustion gases and oil pass through the reaction section 37 in a state of sufficient annular separation to prevent carbon deposition on the walls of chamber 37. The hydrocarbon oil is converted or decomposed to carbon black by the heat supplied from the helical flow of combustion gases.

Referring again to Figure 1, the outlet conduit 31 of reactor 16 conveys the gaseous products into an electrical precipitator 45. Conduits 31a and 31b convey the gaseous products from reactors 16a and 16b into precipitator 45. Conduits 31, 31a and 31b can extend a substantial distance to provide atmospheric cooling of the gaseous products. Precipitator 45 separates a large portion of the carbon black from the effluent gases. This black is passed into a screw conveyor 46 which communicates with a pulverizer 47. The effluent gases from precipitator 45 are passed through one or more cyclone separators 48. The additional carbon black removed by these separators is passed to conveyor 46. The gaseous effluent from separators 48 is directed through a bag filter unit 49 and thence to an outlet conduit 50. The carbon black removed by filter 49 is also passed to conveyor 46. The carbon black removed from pulverizer 47 is treated in a suitable manner for shipment, as by passage through a pellet mill, not shown.

Figure 6:
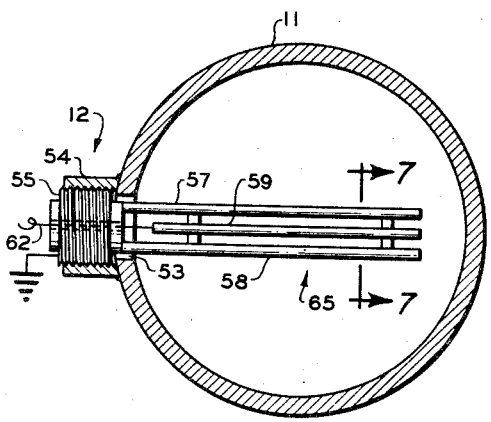
Figure 6 is a detailed view of the dielectric measuring probe employed in the apparatus of Figure 1.
Figure 7:
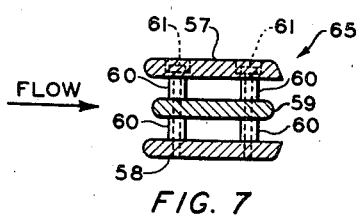
Figure 7 is a sectional view taken along line 7—7 in Figure 6.

In accordance with the control method of this invention the dielectric properties of the hydrocarbon conversion oil supplied by conduit 11 are measured by a probe unit 12 which is illustrated in Figure 6. Conduit 11 has an opening 53 in the side wall thereof which receives the dielectric probe unit. A threaded shoulder 54 is attached to conduit 11 to surround opening 53. The probe unit can be in the form of a base 55 which is threaded into shoulder 54. Base 55 supports a pair of spaced plates 57 and 58 which extend into conduit 11. As illustrated in Figure 7, these plates can be streamlined to minimize resistance to the flow of oil through the conduit. Plates 57 and 58 are in electrical contact with base 55, which can be grounded electrically. A center plate 59 is mounted between plates 57 and 58 by electrically insulating spacers 60. The three plates are held in assembled relation by screws 61 which extend through spacers 60. An electrical lead 62 is attached to plate 59 and extends outwardly through an opening in base 57. Suitable sealing means are provided about base 55 to prevent leakage of oil from conduit 11. Spaced plates 57, 58 and 59 thus form an electrical condenser wherein the oil passed through conduit 11 constitutes the dielectric material between the plates.

Figure 8:
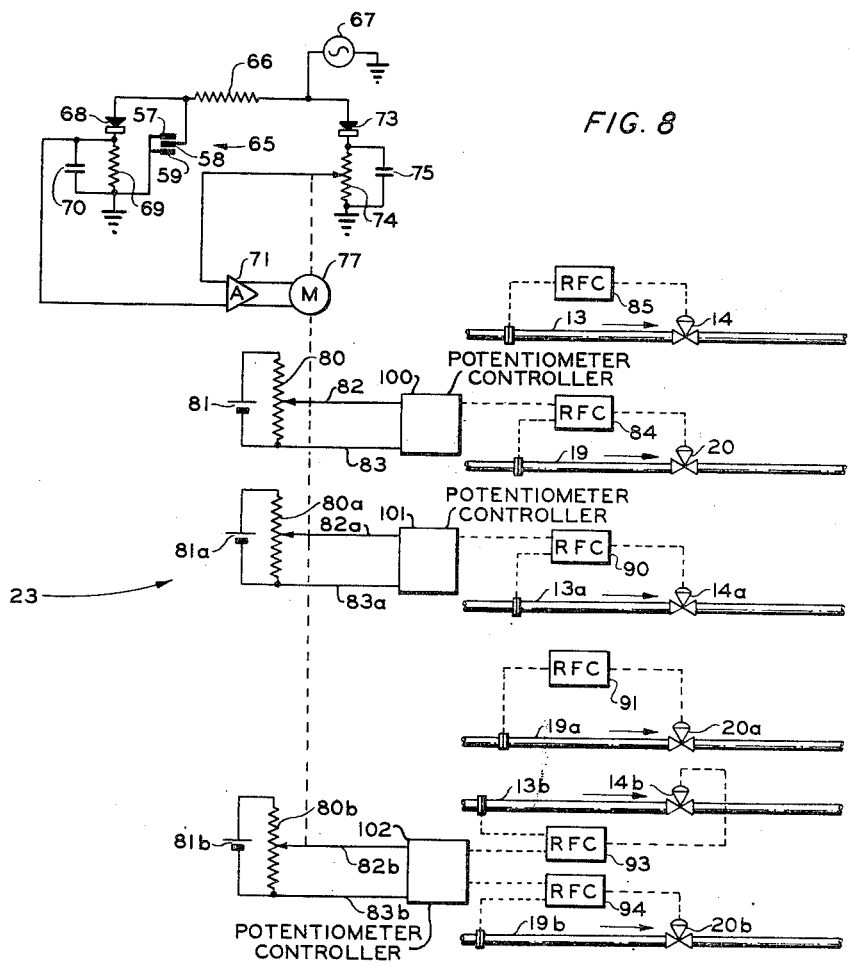
Figure 8 is a schematic representation of the control apparatus of Figure 1.

The dielectric properties of the oil in conduit 11 are measured by measuring the capacitance of the condenser formed by plates 57, 58 and 59. This unit will be referred to as capacitor 65. One terminal of capacitor 65 is connected to ground and the second terminal thereof is connected to the first terminal of a resistor 66 as shown in Figure 8. The second terminal of resistor 66 is connected to the first terminal of a source of alternating current 67. The second terminal of current source 67 is grounded. A rectifier 68 and a resistor 69 are connected in series relation with one another and in parallel with capacitor 65. A capacitor 70 is connected in parallel with resistor 69. The junction between rectifier 68 and resistor 69 is connected to the first input terminal of an amplifier 71. A second rectifier 73 and a potentiometer 74 are connected in series relation with one another between the first terminal of current source 67 and ground. A capacitor 75 is connected in parallel with potentiometer 74. The contactor of potentiometer 74 is connected to the second input terminal of amplifier 71.

The circuit thus far described is a modified form of a Wheatstone bridge. Resistor 66 and capacitor 65 can be considered as two arms of the bridge circuit. The upper and lower portions of potentiometer 74 can be considered as the other two arms of the bridge. Current source 67 is connected across first opposite terminals of the bridge. Amplifier 71 serves as a bridge unbalance indicator and is connected between the second opposite terminals of the bridge. Rectifiers 68 and 73 are provided to convert the alternating current bridge unbalance signal into a corresponding direct current which is applied to the input of amplifier 71. The output terminals of amplifier 71 are connected to a reversible servomotor 77. The drive shaft of motor 77 is mechanically coupled to the contactor of potentiometer 74. Amplifier 71 can include a converter in the input circuit thereof to convert the input D. C. signal into a corresponding alternating signal. Servomotor 77 can be a reversible two phase motor which rotates in a first direction when a signal of first phase is applied thereto and rotates in a second direction when a signal of 180° out of phase with the first signal is applied thereto. Thus, any electrical unbalance of the bridge circuit drives motor 77 in a direction so that the contactor of potentiometer 74 is moved until the unbalance signal is again zero. Any change in the dielectric properties of the fluid in conduit 11 thus results in movement of the contactor of potentiometer 74. The magnitude and direction of this movement are functions of the direction of and the magnitude of the change of the dielectric properties of the oil flowing through conduit 11.

The drive shaft of motor 77 is also mechanically coupled to the contactor of a potentiometer 80. A voltage source 81 is connected across the end terminals of potentiometer 80. The contactor and one end terminal of potentiometer 80 are connected by respective leads 82 and 83 to the input terminals of a potentiometer controller 100. Controller 100 provides an output air pressure representative of the electrical signal applied thereto. This air pressure resets a flow controller 84 which adjusts valve 20 in conduit 19 of Figure 1 in response to the rotation of motor 77. Valve 14 in conduit 13 is adjusted by a rate-of-flow controller 85 which maintains a predetermined flow through conduit 13.

Figure 9:
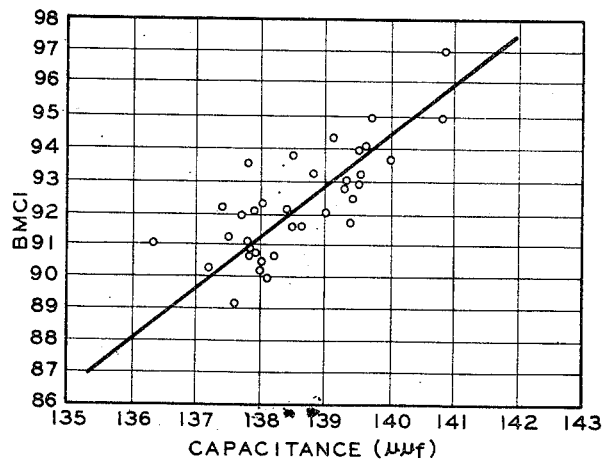
Figure 9 shows the correlation between the BMCI and dielectric properties of the conversion oil.

As previously mentioned, the control method of this invention is based upon the discovery that the dielectric properties of the conversion oil are definite functions of the correlation index of the oil, which in turn is a measurement of the carbon available for conversion. Thus, the ratio of air to oil supplied to the reactor should be set as a function of the available carbon in the oil. The greater the carbon available in a given volume of oil, the greater is the amount of oil that can be supplied to the reactor. In Figure 9 there is shown the relationship between the dielectric properties of several oils and their correlation indices. The dielectric properties are plotted in terms of the measured capacitance of a condenser filled with the oils. The particular condenser had a capacitance of 49.4 micro-micro-farads when air occupied the region between the spaced plates. The ratio of air to oil supplied to reactor 16 is held at a preselected value for an oil of any given BMCI oil. This is provided by setting controller 85 to maintain a predetermined oil flow and resetting controller 84 if the measured capacitance changes. If the measured capacitance decreases, for example, this means the BMCI of the oil has decreased so that more air is needed for a given volume of oil. Valve 20 is opened by a preselected amount. If the measured capacitance increases, valve 20 is closed.

Obviously, the desired air-oil ratio can be established by maintaining the air flow constant and adjusting the oil flow in response to rotation of motor 77. This is illustrated in Figure 8 in conjunction with conduits 19a and 13a. The flow through conduit 19a is held constant by a rate-of-flow controller 91 which adjusts valve 20a. The flow through conduit 13a is varied by a flow controller 90 which is reset by the signal from a potentiometer controller 101 which is actuated by the signal from telemetering potentiometer 80a.

A third method of control is illustrated in Figure 8 in conjunction with conduits 19b and 13b. Valves 20b and 14b in these conduits are adjusted by respective flow controllers 93 and 94. Controllers 93 and 94 are both actuated, but in opposite directions, by the signal from a potentiometer controller 102 which is actuated by the signal from potentiometer 80b. If the measured capacitance of the oil increases, for example, valve 14b is opened and valve 20b is closed somewhat to decrease the air-oil ratio. Conversely, if the measured capacitance decreases, the valves are actuated in an opposite manner. Obviously, the three illustrated valve control systems of Figure 8 can be selected as desired in a particular carbon black producing operation.

While the invention has been described in conjunction with present preferred embodiments, it should be evident that it is not limited thereto.

What is claimed is:

1. A method of controlling the operation of a carbon black producing furnace having a cylindrical reaction chamber with a first axial opening in one end thereof and a second opening in the side wall thereof tangential to the side wall, which comprises passing a hydrocarbon conversion oil to said chamber through said first opening, passing air to said chamber through said second opening, measuring the dielectric properties of said conversion oil passed to said chamber, and adjusting the ratio of air to oil passed to said chamber in response to said measurement.

2. A method of controlling the operation of a carbon black producing furnace having a cylindrical reaction chamber with a first axial opening in one end thereof and a second opening in the side wall thereof tangential to the side wall, which comprises passing a hydrocarbon conversion oil to said chamber through said first opening at a predetermined rate, passing air to said chamber through said second opening, measuring the dielectric properties of said conversion oil passed to said chamber, and adjusting the flow of air to said chamber in response to said measurement.

3. A method of controlling the operation of a carbon black producing furnace having a cylindrical reaction chamber with a first axial opening in one end thereof and a second opening in the side wall thereof tangential to the side wall, which comprises passing hydrocarbon conversion oil to said chamber through said first opening, passing air to said chamber through said second opening at a preselected rate, measuring the dielectric properties of said conversion oil passed to said chamber, and adjusting the flow of oil passed to said chamber in response to said measurement.

4. A method of controlling the operation of a carbon black producing furnace having a cylindrical reaction chamber with a first axial opening in one end thereof and a second opening in the side wall thereof tangential to the side wall, which comprises passing a hydrocarbon conversion oil to said chamber through said first opening, passing air to said chamber through said second opening, measuring the dielectric constant of said conversion oil passed to said chamber, and adjusting the ratio of air to oil passed to said chamber in response to said measurement so that said air to oil ratio is decreased as the measured dielectric constant increases and is increased as the measured dielectric constant decreases.

5. A method of controlling the operation of a plurality of carbon black producing furnaces, each having a cylindrical reaction chamber with a first axial opening in one end thereof and a second opening in the side wall thereof tangential to the side wall, which comprises passing hydrocarbon conversion oil to each of said chambers through said first openings, passing air to each of said chambers through said second openings, measuring the dielectric properties of said conversion oil, and adjusting the ratio of air to oil passed to each of said chambers in response to said measurement.

6. A method of producing carbon black which comprises passing a hydrocarbon conversion oil into the first end of a cylindrical reaction chamber along the axis thereof, passing air into said chamber adjacent said first end and in a direction tangential to the side wall of said chamber, removing the reaction products from the second end of said chamber, separating the produced carbon black from gases in said reaction products, measuring the dielectric properties of said conversion oil passed to said chamber, and adjusting the ratio of air to oil passed to said chamber in response to said measurement.

7. A method of producing carbon black which comprises passing a hydrocarbon oil into the first end of a cylindrical reaction chamber along the axis thereof, passing a mixture of air and a combustible gas into said chamber adjacent said first end in a direction tangential to the side wall of said chamber, removing the reaction products from the second end of said chamber, separating the produced carbon black from gases in said reaction products, measuring the dielectric properties of said conversion oil passed to said chamber, and adjusting the ratio of said mixture of air and gas to said conversion oil passed to said chamber in response to said measurement.

8. Apparatus for controlling the operation of a carbon black producing furnace having a cylindrical reaction chamber with a first axial opening in one end thereof and a second opening in the side wall thereof tangential to the side wall of the chamber, comprising first conduit means communicating with said first opening, means associated with said first conduit means to measure the dielectric properties of fluid passed therethrough, second conduit means communicating with said second opening, and means responsive to said means to measure dielectric properties to control the relative flow rates of fluids through said first and second conduit means.

9. The combination in accordance with claim 8 wherein said means to measure dielectric properties comprises at least a pair of spaced electrodes positioned in said first conduit means so that fluid in said first conduit means forms the dielectric between said electrodes, and means to measure the capacitance of the condenser formed by said spaced electrodes, said capacitance being a measurement of the dielectric properties of the fluid between said spaced electrodes; and wherein said means to control increases the ratio of fluid flow through said second conduit means to the fluid flow through first said conduit means as the measured capacitance decreases and decreases said ratio as the measured capacitance increases.

10. The combination in accordance with claim 9 wherein said spaced electrodes comprise first and second parallel metal plates mounted in spaced relation with one another, the planes of said plates being substantially parallel to the direction of fluid flow through said first conduit means.

11. The combination in accordance with claim 9 wherein said means to measure capacitance comprises a first impedance element connected in series relation with the condenser formed by said spaced electrodes, a source of alternating potential connected across said series connected first impedance element and said condenser, second and third impedance elements connected in series relation with one another and in parallel with said series connected first impedance element and said condenser, means to detect a potential difference between the junction between said first impedance element and said capacitor and the junction between said second and third impedance elements, and means responsive to said means to detect to adjust the relative impedances of said first, second and third elements until there is a zero potential difference between said junctions, the amount of said adjustment being representative of the capacitance of said condenser.

12. Apparatus for controlling the operation of a carbon black producing furnace having a cylindrical reaction chamber with a first axial opening in one end thereof and a second opening in the side wall thereof tagential to the side wall of said chamber, comprising first conduit means communicating with said first opening, means associated with said first conduit means to maintain a predetermined fluid flow therethrough, means associated with said first conduit means to measure the dielectric properties of fluid passed therethrough, second conduit means communicating with said second opening, and means responsive to said means to measure dielectric properties to control rate of fluid flow through said second conduit means.

13. Apparatus for controlling the operation of a carbon black producing furnace having a cylindrical reaction chamber with a first axial opening in one end thereof and a second opening in the side wall thereof tangential to the side wall of the chamber, comprising first conduit means communicating with said first opening, means associated with said first conduit means to measure the dielectric properties of fluid passed therethrough, second conduit means communicating with said second opening, means associated with said second conduit means to maintain a predetermined fluid flow therethrough, and means responsive to said means to measure dielectric properties to control the rate of fluid flow through said first conduit means.

References Cited in the file of this patent

UNITED STATES PATENTS

| | | |
|---|---|---|
| 2,197,904 | Terry | Apr. 23, 1940 |
| 2,375,795 | Krejci | May 15, 1945 |
| 2,564,700 | Krejci | Aug. 21, 1951 |
| 2,577,435 | Siebenthaler | Dec. 4, 1951 |
| 2,685,917 | Perry | Aug. 10, 1954 |
| 2,720,624 | Gunst et al. | Oct. 11, 1955 |

OTHER REFERENCES

Washburn: "International Critical Tables," 1st edition, vol. VI, 82 (1929), McGraw-Hill Book Co., New York, N. Y.